(12) United States Patent
Schäfer et al.

(10) Patent No.: US 7,108,320 B2
(45) Date of Patent: Sep. 19, 2006

(54) HEAD RESTRAINT FOR A VEHICLE SEAT

(75) Inventors: Volker Schäfer, Otterbach (DE);
Thomas Jung, Aschbach (DE);
Andreas Berberich, Landstuhl (DE);
Olaf Kreuels, Zweibrücken (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 277 days.

(21) Appl. No.: 10/727,867

(22) Filed: Dec. 4, 2003

(65) Prior Publication Data
US 2006/0012226 A1    Jan. 19, 2006

Related U.S. Application Data

(63) Continuation of application No. PCT/EP03/02333, filed on Mar. 7, 2003.

(30) Foreign Application Priority Data

Apr. 5, 2002    (DE) ................ 102 15 054

(51) Int. Cl.
*B60N 2/48* (2006.01)
*B60N 2/42* (2006.01)
*B60R 21/00* (2006.01)

(52) U.S. Cl. ................. 297/216.12; 297/391

(58) Field of Classification Search ........... 297/391, 297/216.12, 217.3
See application file for complete search history.

(56) References Cited

U.S. PATENT DOCUMENTS

| | | | |
|---|---|---|---|
| 3,586,366 A | 6/1971 | Patrick | |
| 3,838,870 A | 10/1974 | Hug | |
| 4,511,180 A | 4/1985 | Klaus | |
| 4,668,014 A | 5/1987 | Boisset | |
| 4,720,146 A | 1/1988 | Mawbey et al. | |
| 5,290,091 A | 3/1994 | Dellanno et al. | |
| 5,468,045 A | 11/1995 | Weber | |
| 5,590,933 A * | 1/1997 | Andersson | 297/408 |
| 5,738,412 A | 4/1998 | Aufrere et al. | |
| 5,820,211 A | 10/1998 | Heilig et al. | |
| 5,934,750 A | 8/1999 | Föhl | |
| 6,074,011 A | 6/2000 | Ptak et al. | |
| 6,079,776 A | 6/2000 | Breitner et al. | |
| 6,082,817 A | 7/2000 | Müller | |
| 6,088,640 A | 7/2000 | Breed | |
| 6,203,105 B1 | 3/2001 | Rhodes, Jr. | |
| 6,213,548 B1 | 4/2001 | Van Wynsberghe et al. | |
| 6,270,161 B1 | 8/2001 | De Filippo | |
| 6,352,285 B1 * | 3/2002 | Schulte et al. | 280/756 |
| 6,474,733 B1 | 11/2002 | Heilig et al. | |
| 6,478,373 B1 | 11/2002 | Hake et al. | |
| 6,623,073 B1 | 9/2003 | Schäfer et al. | |

(Continued)

FOREIGN PATENT DOCUMENTS

DE    39 00 495 A1    7/1990

(Continued)

*Primary Examiner*—Peter M. Cuomo
*Assistant Examiner*—Joseph Edell
(74) *Attorney, Agent, or Firm*—Womble Carlyle Sandridge & Rice, PLLC

(57) ABSTRACT

In the case of a head restraint (1) for a vehicle seat, in particular for a motor vehicle, having a fixed first subassembly (11), a moveable second subassembly (13), and a drive (15), which is normally retained by a locking unit (21), moving the second subassembly (13) forward relative to the first subassembly (11), the locking unit (21) has a clamping magnet.

23 Claims, 4 Drawing Sheets

U.S. PATENT DOCUMENTS

| | | |
|---|---|---|
| 6,688,697 B1 | 2/2004 | Baumann et al. |
| 2001/0040396 A1 | 11/2001 | Kreuels et al. |
| 2003/0057758 A1 | 3/2003 | Baumann et al. |
| 2005/0127726 A1 | 6/2005 | Schilling et al. |

FOREIGN PATENT DOCUMENTS

| | | |
|---|---|---|
| DE | 296 03 467 U1 | 8/1996 |
| DE | 296 14 238 U | 12/1996 |
| DE | 197 07 998 A1 | 9/1998 |
| DE | 197 57 533 A1 | 10/1998 |
| DE | 299 07 245 U1 | 9/1999 |
| DE | 699 02 150 T2 | 6/2000 |
| DE | 199 51 966 A1 | 5/2001 |
| DE | 100 01 329 A1 | 7/2001 |
| DE | 100 04 766 A1 | 8/2001 |
| DE | 100 26 978 C1 | 10/2001 |
| DE | 100 47 406 A1 | 4/2002 |
| DE | 102 60 582 B3 | 6/2004 |
| DE | 103 51 367 B3 | 2/2005 |
| EP | 0 974 484 B1 | 1/2000 |
| EP | 0 976 608 A1 | 2/2000 |
| EP | 1 193 114 A1 | 4/2002 |
| JP | 10278648 | 10/1998 |
| JP | 11321502 | 11/1999 |
| WO | WO 98/24652 | 6/1998 |
| WO | WO 01/12465 A1 | 2/2001 |
| WO | WO 03/084777 | 10/2003 |
| WO | WO 04/056606 | 7/2004 |

\* cited by examiner

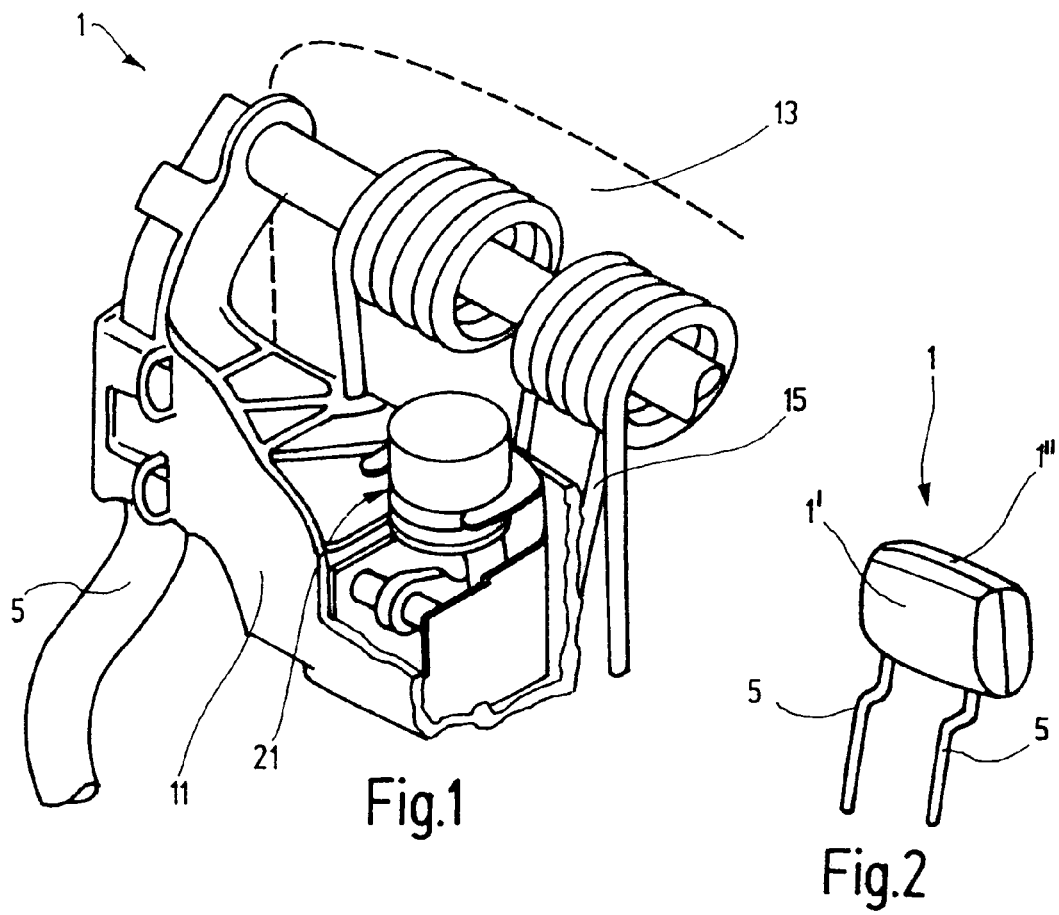
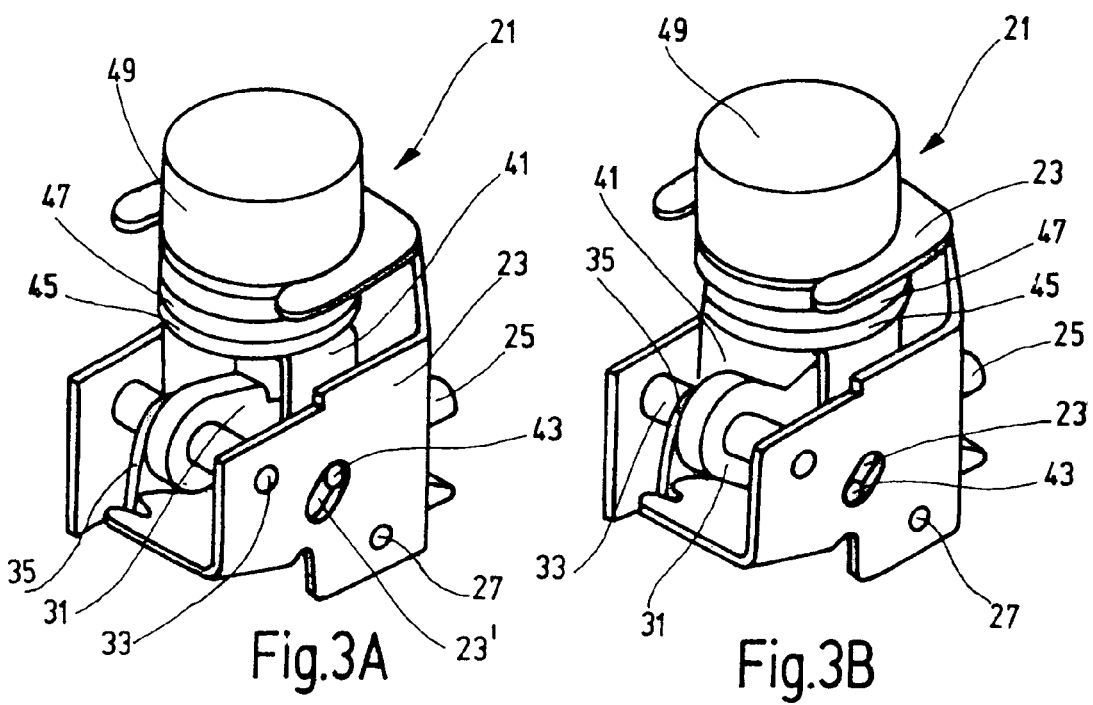

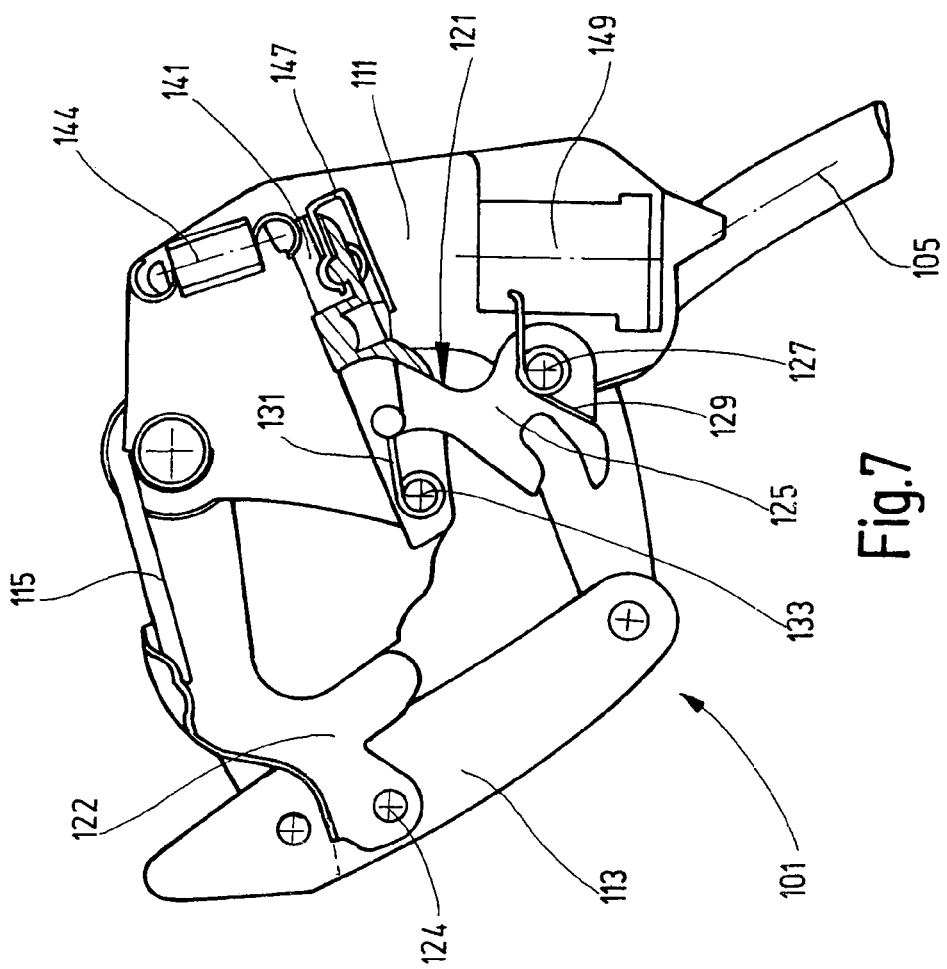
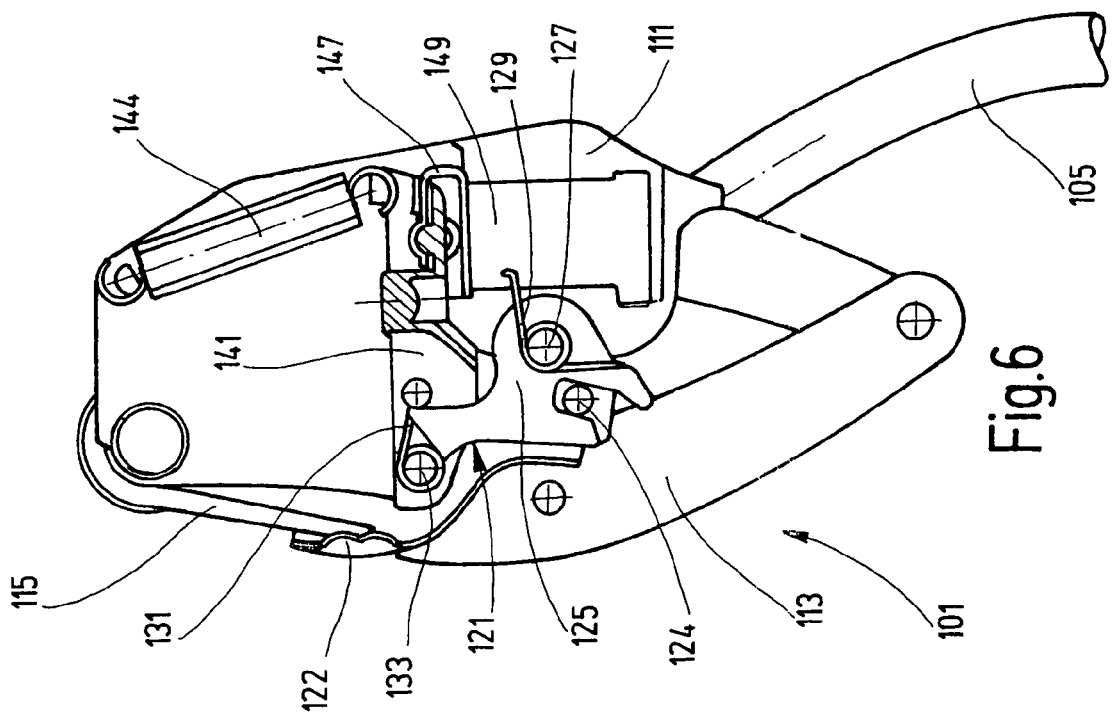

US 7,108,320 B2

HEAD RESTRAINT FOR A VEHICLE SEAT

CROSS-REFERENCE TO RELATED APPLICATION

The present application is a continuation of PCT/EP03/02333, which was filed Mar. 7, 2003, and is incorporated herein by reference in its entirety.

BACKGROUND OF THE INVENTION

The present invention relates to a head restraint for a vehicle seat, in particular for a motor vehicle seat, with the head restraint having a fixed first subassembly, a moveable second subassembly, and a drive, which is normally retained by a locking unit, for moving the second subassembly forward relative to the first subassembly.

DE 39 00 495 A1 discloses a head restraint of the above-described type, in which a displaceable mass is provided as a sensor. In the event of a crash, the sensor releases a locking unit, so that a padded element is pushed rapidly forward by pressure stores acting upon a piston and by springs.

BRIEF SUMMARY OF THE INVENTION

An aspect of the present invention is the provision of improvements to head restraints. In accordance with one aspect of the present invention, a head restraint for a vehicle seat, in particular for a motor vehicle seat, has a fixed first subassembly, a moveable second subassembly, and a drive for moving the second subassembly forward relative to the first subassembly, with the drive normally being retained by a locking unit which includes a clamping magnet.

Because the locking unit has a clamping magnet (i.e. is designed as a locking unit having magnetic retaining force) a reliable and rapid transfer of the locking unit from the locked state into the unlocked state is ensured with a compact construction. In comparison to interlocking solutions, in which a friction has initially to be overcome, the solution according to the present invention, which is virtually frictionless in the uppermost plane of the locking unit, can be released more rapidly. In addition, the magnetic retaining force which is preferably applied by a permanent magnet is not prone to failure. By way of a coil which is preferably provided, the magnetic retaining force can be changed rapidly and to a great extent, for example by, in the event of a crash, the coil of the clamping magnet being energized and a magnetic field which is opposed to the permanent magnet being built up (i.e., the force of the clamping magnet being weakened). However, it is also possible to reinforce the magnetic field in order to reinforce an attracting retaining force.

The magnetic retaining force is preferably used in such a manner that, in a locked state of the locking unit, the clamping magnet secures or holds back the tensioned drive, for example a spring, via retaining means, this generally not taking place directly and immediately, but rather indirectly and in a number of stages by way of suitable step-up ratios. In the event of a crash, the pretensioned retaining means, with the clamping magnet preferably weakened, then releases the tensioned drive, i.e. releases it in a pretension-assisted manner, in particular in a spring-assisted manner. In comparison to solutions in which release takes place in an opposed manner to a pretension, this is more favorable in terms of time, i.e. release takes place more rapidly with the solution according to the present invention. The clamping magnet may also indirectly secure the drive in another manner, i.e. may maintain the locked state, by it securing or holding back pretensioned release means which, in the event of a crash, act when released on the retaining means and therefore cancel the locked state, in which the retaining means retain the tensioned drive.

Preferred retaining means which are provided are pivotable structural elements, such as catches, intercepting elements, clamping elements and the like, which, under their own spring loads, take up certain relative positions with respect to one another. Two retaining means (for example, a catch and an intercepting element or a catch and a retaining spring combined with a release lever) are preferably blocked both in the locked state and in the unlocked state, specifically in different, defined relative positions which are, for example, tilted with respect to each other. The unlocked state can therefore be configured in such a manner that the locking unit is ready to be reset, i.e. can hold the drive again. A clamping plate can be connected in an articulated manner to the intercepting element or can be connected to the release lever used as the release means, and thus, by way of a movement, can either force the intercepting element to release the catch or, by acting upon the retaining means, can end the locked state.

BRIEF DESCRIPTION OF THE DRAWINGS

The present invention is explained in greater detail below with reference to two exemplary embodiments illustrated in the drawings, in which:

FIG. 1 shows a perspective partial view, which is illustrated partially cut away, of the structure of the head restraint according to the first exemplary embodiment with a viewing direction obliquely from the rear, FIG. 2 shows a schematic, perspective view of the head restraint with a viewing direction corresponding to FIG. 1, FIG. 3A shows a partial view of FIG. 1 which shows the locking unit in the locked state, FIG. 3B shows an illustration corresponding to FIG. 3A which shows the locking unit in the unlocked state, FIG. 6 shows a section through the head restraint according to the second exemplary embodiment in the locked state, and FIG. 7 shows a section corresponding to FIG. 6 in the unlocked state.

DETAILED DESCRIPTION OF THE INVENTION

Figure 3C:
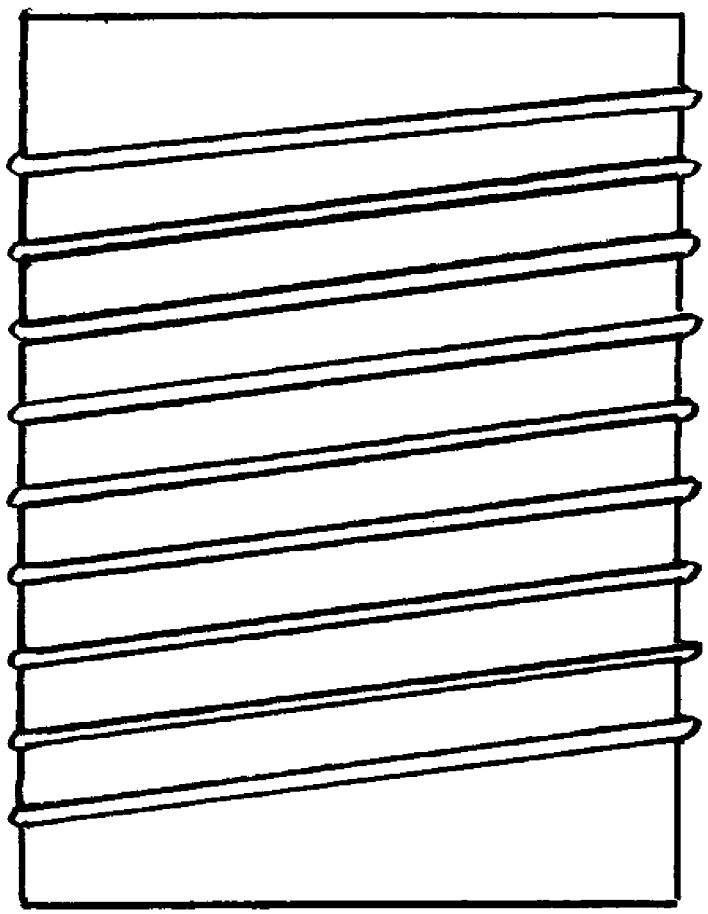
FIG. 3C shows a schematic illustration of the clamping magnet of the locking unit.
Figure 4A:
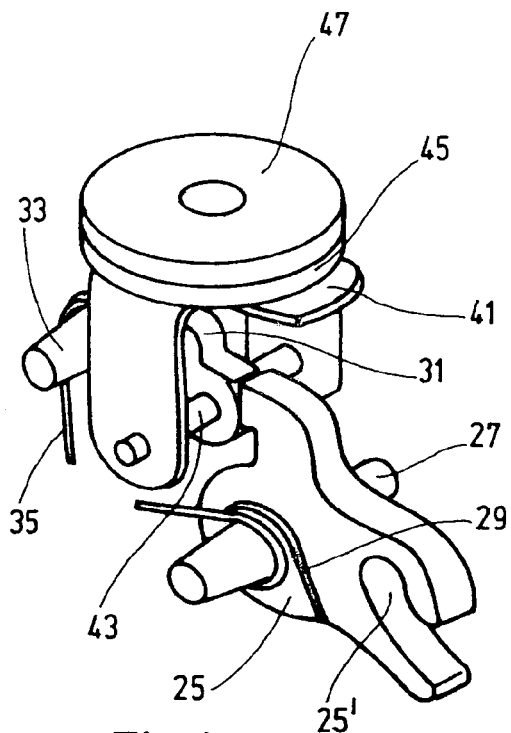
FIG. 4A shows a perspective partial view of the locking unit in the locked state with a viewing direction obliquely from the front.
Figure 4B:
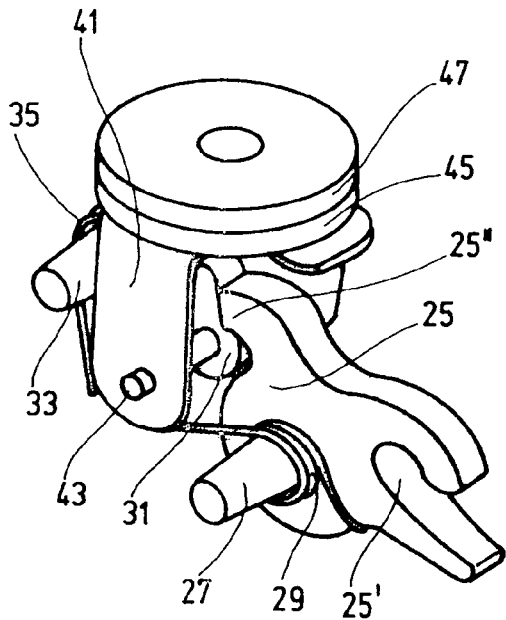
FIG. 4B shows an illustration corresponding to FIG. 4A in the unlocked state.
Figure 5A:
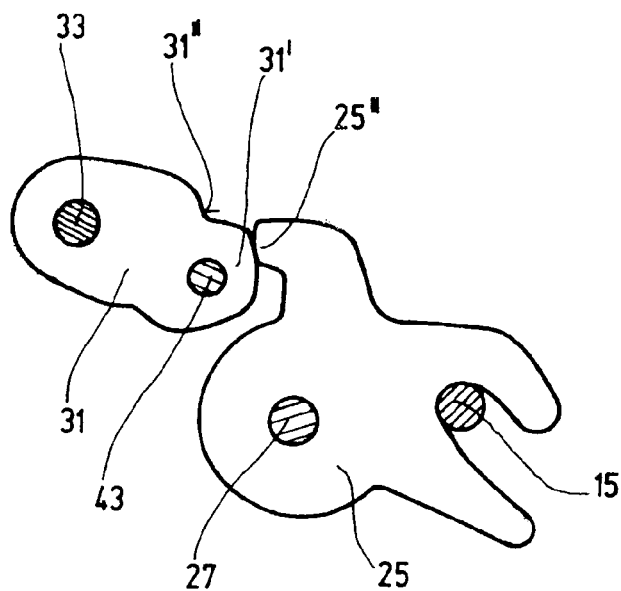
FIG. 5A shows the catch and intercepting element in the locked state of the locking unit.
Figure 5B:
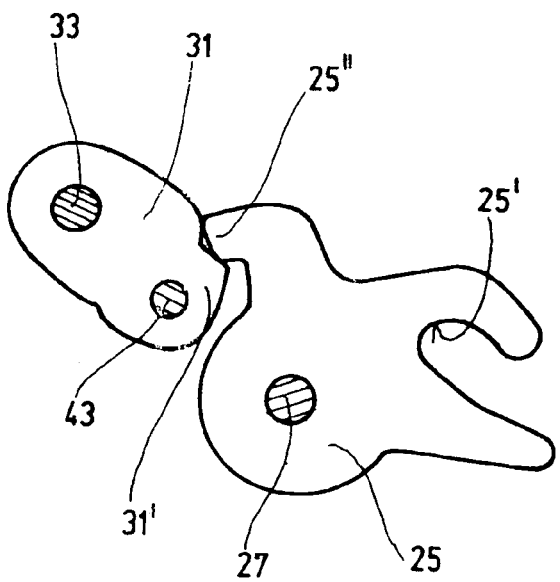
FIG. 5B shows an illustration corresponding to FIG. 5A in the unlocked state.

In the first exemplary embodiment, a head restraint 1 for a vehicle seat has two head restraint rods 5 by way of which it is fastened to the backrest of the vehicle seat. The head restraint 1 comprises a fixed, first subassembly 1' and a moveable, second subassembly 1". In the event of a crash, in particular in a rear crash, the second subassembly 1" is moved forward relative to the fixed, first subassembly 1'. For this, the head restraint 1 has a support 11, which is arranged between the two head restraint rods 5, as the structure of the fixed, first subassembly 1', and an impact body 13 (illustrated by broken lines in FIG. 1) as the structure of the moveable, second subassembly 1", which is articulated on the support 11 by way of a four-bar linkage (not fully illustrated but see the four-bar linkage of FIGS. 6 and 7 for example). A pretensioned double leg spring 15 is used as the drive of the impact body 13 in the event of a crash (e.g., in response to an event of predetermined magnitude).

The double leg spring 15 is normally retained by a locking unit 21, the locked state of which is described below. The locking unit 21 has a housing 23 which is mounted on the support 11 and in which a catch 25 is mounted in a manner such that it can pivot about a catch bolt 27 and which, with its catch mouth 25', secures a horizontally extending central section of the pretensioned double leg spring 15. The catch 25, which is pretensioned in the opening direction by a catch spring 29, is retained by an intercepting element 31 which is arranged in the opening direction and bears via a retaining cam 31' against a retaining lug 25" of the catch 25. The intercepting element 31 is mounted pivotably in the housing 23 on an intercepting-element bolt 33 and is pretensioned upwards by a weak intercepting-element spring 35, i.e. acts counter to the catch spring 29.

A U-shaped, downwardly open sheet metal bracket 41 is fixed at its free ends by way of a sheet metal bracket bolt 43 on the intercepting element 31. The sheet metal bracket bolt 43 engages in slotted guides 23' of the housing 23. The sheet metal bracket 41 bears, on its upper side, an insulating plate 45 which is in the form of a circular disc, is made of plastic and on which an annular clamping plate 47 of the same diameter is riveted to the sheet metal bracket 41 through the insulating plate 45 or is adhered in a modified form. The clamping plate 47, which consists of soft iron, bears against the underside of a cylindrically shaped clamping magnet 49 which is provided with a permanent magnet and a coil which is wound around it and is initially unenergized. FIG. 3C schematically illustrates two of the features of the clamping magnet 49, namely the coil wound around the permanent magnet. The clamping magnet 49 has an annular groove with which it is pushed into a fork-shaped tab region of the housing 23 and thereby fixed. The magnetic retaining force of the clamping magnet 49 thus retains the locking unit 21 in the locked state via the previously described retaining means.

In the event of a crash, the locking unit 21 transfers from the locked into the unlocked state. For this purpose, a control unit (not illustrated) which is connected to an acceleration sensor energizes the coil of the clamping magnet 49, the magnetic field of which is opposed to that of the permanent magnet. The retaining force of the clamping magnet 49 is reduced as a result, i.e. the clamping plate 47 can move together with the sheet metal bracket 41 via the intercepting element 31. The spring-loaded catch 25 can therefore press the intercepting element 31 downward, i.e. the retaining cam 31' is released from the retaining lug 25". With the pivoting movement of the intercepting element 31, the clamping plate 47 executes a tilting movement which is defined by the sheet metal bracket bolt 43 being guided in the slotted guides 23'. The catch spring 29 pivots the catch 25 in the opening direction until the retaining lug 25" passes into a retainer 31" of the intercepting element 31 arranged above the retaining cam 31', and the catch 25 is blocked as a result. The opening catch 25 releases the double leg spring 15 which flicks the impact body 13 forward, so that it approaches the occupants head.

In order to restore the system, i.e. to reset it, the impact body 13 can be pushed back into its starting position, as a result of which it tensions the double leg spring 15. As soon as the double leg spring 15 comes into contact with a lip of the catch mouth 25', it pivots the catch 25 in the closing direction counter to the force of the catch spring 29. The retaining lug 25" is removed from the retainer 31", so that the intercepting-element spring 35 pivots the intercepting element 31 back, i.e. upward, where it again retains the catch 25. The clamping plate 47 which is lifted above the sheet metal bracket 41 passes again into contact with the clamping magnet 49 and, owing to the attracting force of the latter, retains the intercepting element 31 at the top, i.e. retains the locking unit 21 in the locked state.

The second exemplary embodiment largely corresponds with the first exemplary embodiment, for which reason identical and identically acting components bear reference numbers which are higher by 100. The head restraint 101 likewise has a support 111 on two head restraint rods 105 as the structure of a fixed, first subassembly, and an impact body 113 which can be moved relative to the support 111 by way of two four-bar linkages, as the structure of a moveable, second subassembly. A double leg spring 115 which is retained by a locking element 121 is provided as the drive for the impact body 113. The locking unit 121 has an intercepting plate 122 which can be pivoted coaxially with the double leg spring 115 and holds the latter back and on the free end of which a horizontally arranged retaining bolt 124 is provided. A catch 125, which can be pivoted about a catch bolt 127 and is pretensioned in the opening direction by a catch spring 129, secures the retaining bolt 124 in an interlocking manner.

A retaining spring 131 is wound with part around a spring-retaining bolt 133. With the other part, which defines a moveable bearing arm and is angled at the end and is provided with a round element, the retaining spring 131 engages behind the catch 125 on the side which is in advance in the opening direction. In this case, the bearing arm points approximately in the opening direction, and so the catch 125 can only exert a small opening moment on the retaining spring 131. A release lever 141 which is likewise mounted pivotably on the spring-retaining bolt 133 is pretensioned by a release spring 144, the release lever bearing, on the side which faces away from the release spring 144, a clamping plate 147 which consists of soft iron and is attracted by a clamping magnet 149 counter to the force of the release spring 144.

The clamping magnet 149 again has an initially unenergized coil and a permanent magnet which, in the locked state of the locking device 121, applies the necessary magnetic retaining force in order to retain the release lever 141 and therefore the entire locking device 121. In the event of a crash, the coil is briefly energized, i.e. with a pulse, the orientation of the coil causing the magnetic field of the permanent magnet to be weakened and therefore significantly reducing the magnetic retaining force of the clamping magnet 149. The clamping magnet 149 therefore releases the clamping plate 147, so that the release spring 144 can pull the release lever 141 away from the clamping magnet 149, upward in the drawing. The retaining spring 131 is coupled to the release lever 141 so that it can be carried along, with the result that it is likewise pulled upward. As a result, the catch 125 comes free, so that the catch spring 129 can open the catch 125, i.e. the intercepting plate 122 and therefore the double leg spring 115 are released by the locking device 121 which is unlocked in this manner, whereupon the impact body 113 is extended.

In order to restore the head restraint 101, the release lever 141 is brought back to the clamping magnet 149 by which it is again attracted via the clamping plate 147. When the impact body 113 is pressed back, the retaining bolt 124 passes into the opened catch 125 and rotates the latter back. As soon as the retaining spring 131 can engage behind the catch 125 again, the locking device 121 is again in a locked state.

The invention claimed is:

1. A head restraint for a vehicle seat, wherein the head restraint operates favorably in response to an event of predetermined magnitude, and the head restraint comprises:
a first subassembly;
a second subassembly mounted for moving forward relative to the first subassembly;
a drive mounted for moving the second subassembly forward relative to the first subassembly; and
a locking unit operative for having
    (a) a locked state prior to the event of predetermined magnitude, wherein in the locked state the locking unit prevents the drive from moving the second subassembly forward relative to the first subassembly, and
    (b) an unlocked state in response to the event of predetermined magnitude, wherein in the unlocked state the locking unit does not prevent the drive from moving the second subassembly forward relative to the first subassembly, whereby the drive moves the second subassembly forward relative to the first subassembly in response to the event of predetermined magnitude,
wherein the locking unit comprises a magnet arranged so that a magnetic field of the magnet is operative for maintaining the locking unit in the locked state prior to the event of predetermined magnitude, and
wherein the magnet is a permanent magnet and the locking unit further comprises a coil that is for producing a magnetic field in response to the coil being electrically energized.

2. A head restraint according to claim 1, wherein the coil is arranged so that the magnetic field produced by the coil counteracts the magnetic field of the permanent magnet and thereby causes the locking unit to transition to the unlocked state.

3. A head restraint according to claim 1, wherein:
the drive
    (a) is in a first configuration during the locked state,
    (b) is in a second configuration as the drive completes the moving of the second subassembly forward relative to the first subassembly, and
    (c) is biased toward the second configuration, whereby the drive moves the second subassembly forward relative to the first subassembly during the unlocked state; and
the locking unit further comprises a retainer for being acted upon by the magnetic field of the magnet and thereby retaining the drive in the first configuration during the locked state.

4. A head restraint according to claim 3, wherein the retainer is further for releasing the drive in the unlocked state, whereby the drive transitions from the first configuration to the second configuration and thereby moves the second subassembly forward relative to the first subassembly.

5. A head restraint according to claim 4, wherein the retainer comprises pivotable, spring-loaded components.

6. A head restraint according to claim 3, wherein the retainer comprises pivotable, spring-loaded components.

7. A head restraint according to claim 3, wherein the retainer is a retaining means for being acted upon by the magnetic field of the magnet and thereby retaining the drive in the first configuration during the locked state.

8. A head restraint according to claim 7, wherein the retaining means is further for releasing the drive in the unlocked state, whereby the drive transitions from the first configuration to the second configuration and thereby moves the second subassembly forward relative to the first subassembly.

9. A head restraint for a vehicle seat, wherein the head restraint operates favorably in response to an event of predetermined magnitude, and the head restraint comprises:
a first subassembly;
a second subassembly mounted for moving forward relative to the first subassembly;
a drive mounted for moving the second subassembly forward relative to the first subassembly; and
a locking unit operative for having
    (a) a locked state prior to the event of predetermined magnitude, wherein in the locked state the locking unit prevents the drive from moving the second subassembly forward relative to the first subassembly, and
    (b) an unlocked state in response to the event of predetermined magnitude, wherein in the unlocked state the locking unit does not prevent the drive from moving the second subassembly forward relative to the first subassembly, whereby the drive moves the second subassembly forward relative to the first subassembly in response to the event of predetermined magnitude,
wherein the locking unit comprises a magnet arranged so that a magnetic field of the magnet is operative for maintaining the locking unit in the locked state prior to the event of predetermined magnitude, and
wherein
    (a) the magnet is a compound magnet including a permanent magnet and a coil, and
    (b) the compound magnet is operative so that energizing the coil results in a weakening of said magnetic field, and the weakening of said magnetic field causes the locking unit to transition to the unlocked state.

10. A head restraint according to claim 9, wherein:
the drive is prebiased for moving the second subassembly forward relative to the first subassembly; and
the coil is unenergized during the locked state, whereby said magnetic field is provided solely by the permanent magnet during the locked state.

11. A head restraint for a vehicle seat, wherein the head restraint operates favorably in response to an event of predetermined magnitude, and the head restraint comprises:
a first subassembly;
a second subassembly mounted for moving forward relative to the first subassembly;
a drive mounted for moving the second subassembly forward relative to the first subassembly; and
a locking unit operative for having
    (a) a locked state prior to the event of predetermined magnitude, wherein in the locked state the locking unit prevents the drive from moving the second subassembly forward relative to the first subassembly, and (b) an unlocked state in response to the event of predetermined magnitude, wherein in the unlocked state the locking unit does not prevent the drive from moving the second subassembly forward relative to the first subassembly, whereby the drive moves the second subassembly forward relative to the first subassembly in response to the event of predetermined magnitude, wherein the locking unit comprises a magnet arranged so that a magnetic field of the magnet is operative for maintaining the locking unit in the locked state prior to the event of predetermined magnitude, and wherein
  (a) the drive
    (1) is in a first configuration during the locked state,
    (2) is in a second configuration as the drive completes the moving of the second subassembly forward relative to the first subassembly, and
    (3) is biased toward the second configuration, whereby the drive moves the second subassembly forward relative to the first subassembly during the unlocked state; and
  (b) the locking unit further comprises a retainer for being acted upon by the magnetic field of the magnet and thereby retaining the drive in the first configuration during the locked state;
  (c) the drive comprises a spring; and
  (d) the retainer comprises:
    (1) a catch that is mounted for moving between open and closed configurations, wherein the catch is biased toward the open configuration, and the catch at least indirectly secures the drive while the catch is in the closed configuration during the locked state, and
    (2) a retaining element for retaining the catch in the closed configuration during the locked state, wherein the retaining element is an intercepting element or a retaining spring.

12. A head restraint according to claim 11, wherein the retaining element is the intercepting element and the intercepting element retains the catch in the open configuration during the unlocked state.

13. A head restraint according to claim 11, wherein the magnet is a permanent magnet and the locking unit further comprises a coil that is for producing a magnetic field in response to the coil being electrically energized.

14. A head restraint for a vehicle seat, wherein the head restraint operates favorably in response to an event of predetermined magnitude, and the head restraint comprises:
  a first subassembly;
  a second subassembly mounted for moving forward relative to the first subassembly;
  a drive mounted for moving the second subassembly forward relative to the first subassembly; and
  a locking unit operative for having
    (a) a locked state prior to the event of predetermined magnitude, wherein in the locked state the locking unit prevents the drive from moving the second subassembly forward relative to the first subassembly, and
    (b) an unlocked state in response to the event of predetermined magnitude, wherein in the unlocked state the locking unit does not prevent the drive from moving the second subassembly forward relative to the first subassembly, whereby the drive moves the second subassembly forward relative to the first subassembly in response to the event of predetermined magnitude, wherein the locking unit comprises a magnet arranged so that a magnetic field of the magnet is operative for maintaining the locking unit in the locked state prior to the event of predetermined magnitude, and wherein
  (a) the drive
    (1) is in a first configuration during the locked state,
    (2) is in a second configuration as the drive completes the moving of the second subassembly forward relative to the first subassembly, and
    (3) is biased toward the second configuration, whereby the drive moves the second subassembly forward relative to the first subassembly during the unlocked state, and
  (b) the locking unit further comprises a retainer for being acted upon by the magnetic field of the magnet and thereby retaining the drive in the first configuration during the locked state, and
  (c) the retainer comprises a plate that is attracted to the magnet due to the magnetic field, and the plate is mounted so that:
    (1) the plate is proximate the magnet during the locked state, and
    (2) the plate carries out a tilting or pivoting movement while the locking unit transitions from the locked state to the unlocked state.

15. A head restraint according to claim 14, wherein:
the retainer further comprises
  (a) a catch that is mounted for moving between open and closed configurations, wherein the catch is biased toward the open configuration, and the catch at least indirectly secures the drive while the catch is in the closed configuration during the locked state, and
  (b) a movably mounted retaining element for retaining the catch in the closed configuration during the locked state; and
the plate is connected in an articulated manner to the retaining element.

16. A head restraint according to claim 14, wherein:
the retainer further comprises
  (a) a catch that is mounted for moving between open and closed configurations, wherein the catch is biased toward the open configuration, and the catch at least indirectly secures the drive while the catch is in the closed configuration during the locked state, and
  (b) a releaser for holding the catch in the closed configuration and releasing the catch so that the catch moves from the closed configuration to the open configuration; and
the plate is connected to the releaser.

17. A head restraint according to claim 16, wherein the releaser is a releasing means for holding the catch in the closed configuration and releasing the catch so that the catch moves from the closed configuration to the open configuration.

18. A head restraint for a vehicle seat, wherein the head restraint operates favorably in response to an event of predetermined magnitude, and the head restraint comprises:
  a first subassembly;
  a second subassembly mounted for moving forward relative to the first subassembly;

a drive mounted for moving the second subassembly forward relative to the first subassembly, wherein the drive is in a first configuration prior to the moving of the second subassembly forward relative to the first subassembly, the drive is in a second configuration as the drive completes the moving of the second subassembly forward relative to the first subassembly, and the drive is biased toward the second configuration; and a locking unit operative for having
  (a) a locked state prior to the event of predetermined magnitude, wherein the locking unit prevents the drive from transitioning from the first configuration to the second configuration while the locking unit is in the locked state, and
  (b) an unlocked state in response to the event of predetermined magnitude, wherein the locking unit does not prevent the drive from transitioning from the first configuration to the second configuration while the locking unit is in the unlocked state, whereby the drive moves the second subassembly forward relative to the first subassembly during the unlocked state, wherein the locking unit includes
  (a) a magnet, and
  (b) a retainer for functioning so that the magnet operates via the retainer to maintain the locking unit in the locked state, and wherein the retainer comprises a plate that is attracted to the magnet, and the plate is mounted so that
  (a) the plate is proximate the magnet during the locked state, and
  (b) the plate carries out a tilting or pivoting movement while the locking unit transitions from the locked state to the unlocked state.

19. A head restraint according to claim 18, wherein:
the drive comprises a spring; and
the retainer further comprises
  (a) a catch that is mounted for moving between open and closed configurations, wherein the catch is biased toward the open configuration, and the catch at least indirectly secures the drive while the catch is in the closed configuration during the locked state, and
  (b) a retaining element for retaining the catch in the closed configuration during the locked state, wherein the retaining element is an intercepting element or a retaining spring.

20. A head restraint according to claim 19, wherein the retaining element is the intercepting element and the intercepting element retains the catch in the open configuration during the unlocked state.

21. A head restraint according to claim 18, wherein:
the retainer further comprises
  (a) a catch that is mounted for moving between open and closed configurations, wherein the catch is biased toward the open configuration, and the catch at least indirectly secures the drive while the catch is in the closed configuration during the locked state, and
  (b) a movably mounted retaining element for retaining the catch in the closed configuration during the locked state; and
the plate is connected in an articulated manner to the retaining element.

22. A head restraint according to claim 18, wherein:
the retainer further comprises
  (a) a catch that is mounted for moving between open and closed configurations, wherein the catch is biased toward the open configuration, and the catch at least indirectly secures the drive while the catch is in the closed configuration during the locked state, and
  (b) a releaser for holding the catch in the closed configuration and releasing the catch so that the catch moves from the closed configuration to the open configuration; and
the plate is connected to the releaser.

23. A head restraint for a vehicle seat, wherein the head restraint operates favorably in response to an event of predetermined magnitude, and the head restraint comprises:
a first subassembly;
a second subassembly mounted for moving forward relative to the first subassembly;
a drive mounted for moving the second subassembly forward relative to the first subassembly, wherein the drive is in a first configuration prior to the moving of the second subassembly forward relative to the first subassembly, the drive is in a second configuration as the drive completes the moving of the second subassembly forward relative to the first subassembly, and the drive is biased toward the second configuration; and a locking unit operative for having
  (a) a locked state prior to the event of predetermined magnitude, wherein the locking unit prevents the drive from transitioning from the first configuration to the second configuration while the locking unit is in the locked state, and
  (b) an unlocked state in response to the event of predetermined magnitude, wherein the locking unit does not prevent the drive from transitioning from the first configuration to the second configuration while the locking unit is in the unlocked state, whereby the drive moves the second subassembly forward relative to the first subassembly during the unlocked state, wherein the locking unit includes
  (a) a magnet, and
  (b) a retainer for functioning so that the magnet operates via the retainer to maintain the locking unit in the locked state, and wherein
  (a) the drive comprises a spring, and
  (b) the retainer comprises
    (1) a catch that is mounted for moving between open and closed configurations, wherein the catch is biased toward the open configuration, and the catch at least indirectly secures the drive while the catch is in the closed configuration during the locked state, and
    (2) a retaining element for retaining the catch in the closed configuration during the locked state, wherein the retaining element is an intercepting element and the intercepting element retains the catch in the open configuration during the unlocked state.

* * * * *